US012340223B2

(12) United States Patent
Ren et al.

(10) Patent No.: US 12,340,223 B2
(45) Date of Patent: Jun. 24, 2025

(54) APPARATUS AND METHOD FOR BRANCH PREDICTION USING MACHINE LEARNING WITH NEW LEARNING MODELS

(71) Applicant: HUAWEI TECHNOLOGIES CO., LTD., Shenzhen (CN)

(72) Inventors: Da Qi Ren, Saratoga, CA (US); Qian Wang, Santa Clara, CA (US); XingYu Jiang, Palo Alto, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 17/543,096

(22) Filed: Dec. 6, 2021

(65) Prior Publication Data

US 2022/0091850 A1 Mar. 24, 2022

Related U.S. Application Data

(63) Continuation of application No. PCT/US2020/036438, filed on Jun. 5, 2020.

(60) Provisional application No. 63/032,594, filed on May 30, 2020, provisional application No. 62/858,680, filed on Jun. 7, 2019.

(51) Int. Cl.
*G06F 9/38* (2018.01)
*G06N 3/08* (2023.01)

(52) U.S. Cl.
CPC .......... *G06F 9/3804* (2013.01); *G06F 9/3842* (2013.01); *G06N 3/08* (2013.01)

(58) Field of Classification Search
CPC .... G06F 9/3804; G06F 9/3842; G06F 9/3848; G06N 3/08
See application file for complete search history.

(56) References Cited

U.S. PATENT DOCUMENTS

| 7,673,122 B1 | 3/2010 | Song et al. | |
| 2018/0314524 A1* | 11/2018 | Keskin | G06N 3/045 |
| 2019/0004802 A1* | 1/2019 | Tarsa | G06N 3/084 |
| 2019/0087193 A1 | 3/2019 | Brar et al. | |

OTHER PUBLICATIONS

International Preliminary Report on Patentability dated Dec. 16, 2021, International Application No. PCT/US2020/036438.
(Continued)

*Primary Examiner* — Shawn Doman
(74) *Attorney, Agent, or Firm* — Pearl Cohen Zedek Latzer Baratz LLP (57) ABSTRACT

Branch prediction techniques for pipelined microprocessors are disclosed. A microprocessor for branch predictor selection includes a fetch stage configured to retrieve instructions from a memory. A buffer is configured to store instructions retrieved by the fetch stage, and one or more pipelined stages configured to execute the instructions stored in the buffer. The branch predictor, communicatively coupled to the buffer and the one or more pipelined stages, is configured to select a branch target predictor from a set of branch target predictors. Each of the branch target predictors comprise a trained model associated with a previously executed instruction to identify a target branch path for the instruction currently being executed based on the selected branch target predictor.

16 Claims, 8 Drawing Sheets

(56) References Cited

OTHER PUBLICATIONS

International Search Report & The Written Opinion of the International Searching Authority dated Sep. 16, 2020, International Application No. PCT/US2020/036438.
Vintan, Lucian N., "Dynamic Neural Branch Prediction Fundamentals", URL:http://www.agir.ro/buletine/2501.pdf, Jan. 1, 2016, pp. 1-8.

* cited by examiner

406 Executable code running and the data is collected and used for model training 408 The result models (predictors) with the program name, path, time, inference history and inference function are recorded and saved 410 Multiple predictors (for inference) from different programs and data patterns on storage are managed by inference dictionary

FIG. 4B

| Feature | Feature Name | Feature Description |
|---|---|---|
| 1 | Branch Instruction | The opcode of branch instruction |
| 2 | Branch Direction | F—Forward branch, B—Backward branch |
| 3 | Branch Operand Opcode | The opcode of the instruction that defines the register used in the branch instruction (or ?, if the branch operand is defined in a previous basic block) |
| 4 | Branch Operand Function | The branch function (see text) |
| 5 | Branch Operand Type | The operation type (see text) |
| 15–22 | | Features of the Taken Successor of the Branch |
| 15 | Branch Dominates | D—basic block dominates this successor, or ND—does not dominate |
| 16 | Branch Postdominates | PD—the successor basic block postdominates the basic block with the branch, or NPD—does not postdominate |

APPARATUS AND METHOD FOR BRANCH PREDICTION USING MACHINE LEARNING WITH NEW LEARNING MODELS

CLAIM OF PRIORITY

This application is a continuation of and claims the benefit of priority to International Application Serial No. PCT/US2020/036438, filed Jun. 5, 2020, which claims priority to U.S. Provisional Application No. 62/858,680, filed Jun. 7, 2019, and U.S. Provisional Application No. 63/032,594, filed May 30, 2020, the entire contents of all such applications being hereby incorporated by reference.

FIELD

The following is related generally to the field of microprocessors and, more specifically, to branch prediction in pipelined microprocessors.

BACKGROUND

Accurate branch prediction is critical for modern high-performance pipelined microprocessors to reduce the severe performance penalty caused by branch mispredictions. Modern state-of-the-art microprocessors commonly have sophisticated branch predictors with very low branch misprediction rates. However, due to the complexity of those branch predictors, they take two or more cycles to make a prediction, so that the pipeline has to wait two or more cycles to make the next prediction. Although they can be quite accurate, this long prediction latency lowers instruction fetch throughput and hurts overall performance.

SUMMARY

According to one aspect of the present disclosure, there is provided a microprocessor for branch predictor selection, comprising a fetch stage configured to retrieve instructions from a memory; a buffer configured to store instructions retrieved by the fetch stage; one or more pipelined stages configured to execute the instructions stored in the buffer; and a branch predictor, communicatively coupled to the buffer and the one or more pipelined stages, configured to: select a branch target predictor from a set of branch target predictors, wherein each of the branch target predictors comprise a trained model associated with a previously executed instruction, and identify a target branch path for the one or more instructions currently being executed based on the selected branch target predictor.

Optionally, in the preceding aspect, the branch predictor is further configured to compare the branch target predictor to the one or more instructions currently being executed; and invoke an inference function in the selected branch target predictor when the branch target predictor matches the one or more instructions currently being executed, the inference function identifying the target branch path for the one or more instructions currently being executed; and select a new branch target predictor from the set of branch target predictors when the branch target predictor does not match the one or more instructions currently being executed.

Optionally, in the preceding aspect, the branch predictor is further configured to: iteratively repeat selecting the new branch target predictor in the set of branch target predictors until the selected new branch target predictor matches the one or more instructions currently being executed.

Optionally, in the preceding aspect, the branch predictor is further configured to: training a new model with historical data when none of the branch target predictors in the set of branch target predictors have been selected, wherein the historical data is based on collected data patterns and prediction results corresponding to the currently executing instructions; and storing the new model as one of the branch target predictors in the set of branch target predictors.

Optionally, in the preceding aspect, wherein the trained model corresponding to the selected branch target predictor is updated based on the comparison between the branch target predictor and a result of an actual branch instruction.

Optionally, in the preceding aspect, wherein the set of branch target predictors is stored in a storage accessible to the one or more pipelined stages.

Optionally, in the preceding aspect, wherein each of the one or more branch target predictors stored in the storage include historical data and an associated inference function corresponding to the instructions previously executed by the one or more pipelined stages.

Optionally, in the preceding aspect, wherein each of the branch target predictors include a historical data pattern of the instructions executed by the microprocessor and make predictions related to subsequent instructions based on the historical data pattern associated with the selected branch target predictor while the microprocessor is executing the instructions.

Optionally, in the preceding aspect, further comprising one or more registers to store the historical data pattern for at least one or more executed branch instructions, in which the historical data pattern for a branch represented by a particular branch instruction comprises data patterns and prediction results from a previously executed branch instruction.

Optionally, in the preceding aspect, wherein the branch target predictor comprises a co-processor or field-programmable gate array.

According to another aspect of the present disclosure, there is provided a computer-implemented method for branch predictor selection, comprising fetching instructions from a memory; storing instructions retrieved by the fetch stage in a buffer; executing the instructions stored in the buffer by one or more pipelined stages; selecting, by a branch predictor, a branch target predictor from a set of branch target predictors, wherein each of the branch target predictors comprise a trained model associated with a previously executed instruction; and identifying, by a branch predictor, a target branch path for the one or more instructions currently being executed based on the selected branch target predictor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The following is related generally to the field of microprocessors and, more specifically, to branch prediction in pipelined microprocessors. Modern computing architectures increasingly rely on speculation to boost instruction-level parallelism. For example, data that is likely to be read in the near future is speculatively prefetched, and predicted values are speculatively used before actual values are available. Accurate prediction mechanisms are a driving force behind these techniques, so increasing the accuracy of predictors increases the performance benefit of speculation. The branch predictor in the disclosed technology increases the accuracy of branch prediction, and therefore performance, by training data models using neural networks in which to accurately predict the direction or address of a branch instruction. The neural network uses a feature set, in this case branch features, as input into the neural network, which then outputs a branch prediction model based on historical information, such as data patterns and prediction results from previously executed instruction sets.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1A:
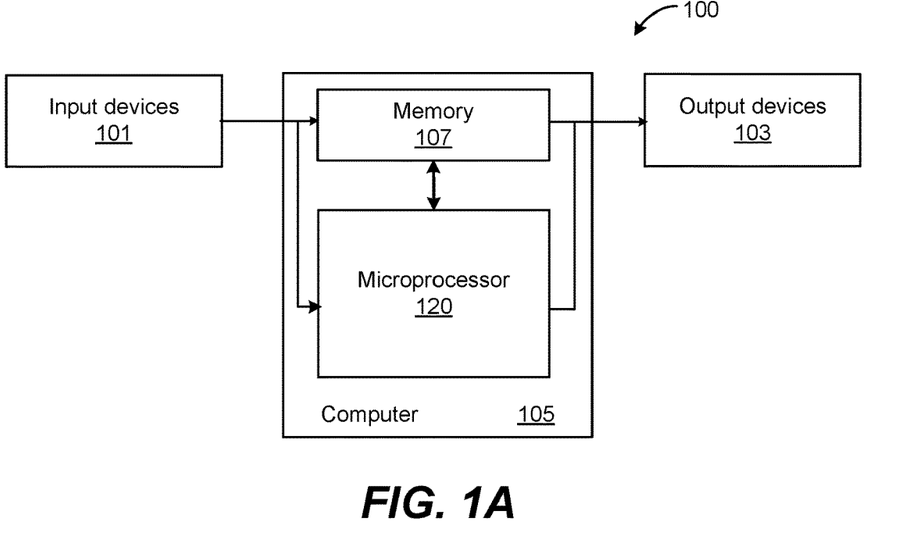
FIGS. 1A and 1B are respectively block diagrams of a computer system and a microprocessor that can be incorporated into such a computer system.
Figure 1B:
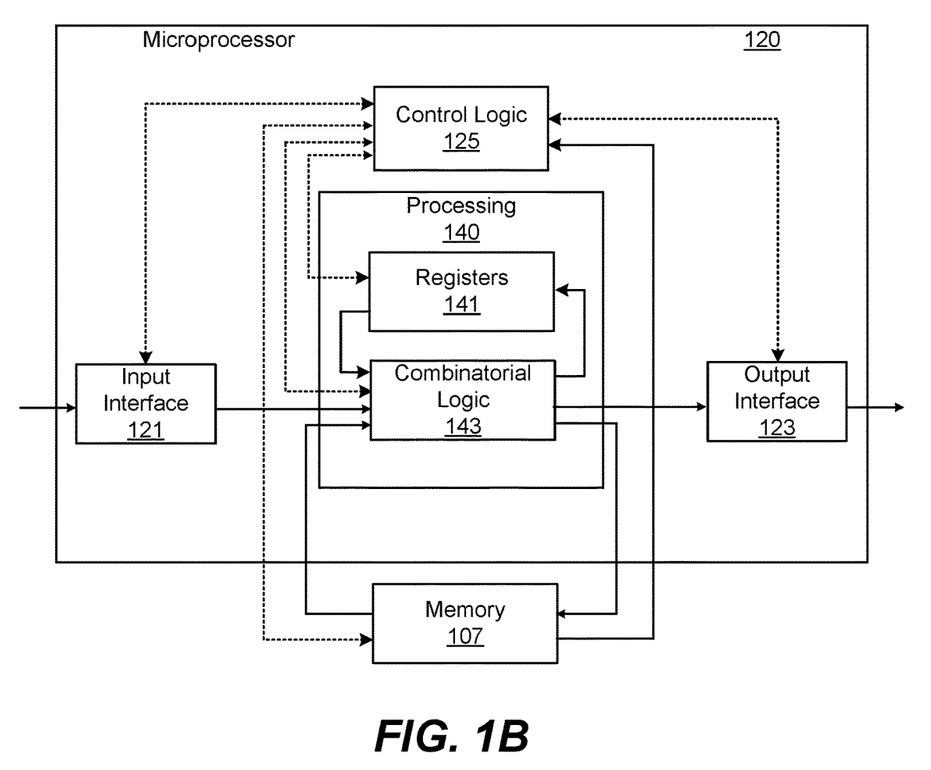

FIGS. 1A and 1B are respectively block diagrams of a computer system and a microprocessor such as can be incorporated into such a computer system. In the simplified representation of FIG. 1A, the computer system 100 includes a computer 105, one or more input devices 101 and one or more output devices 103. Common examples of input devices 101 include a keyboard or mouse. Common examples of output devices 103 include monitors or printers. The computer 105 includes memory 107 and microprocessor 120, where in this simplified representation the memory 107 is represented as a single block. The memory 107 can include ROM memory, RAM memory and non-volatile memory and, depending on the embodiment, include separate memory for data and instructions.

FIG. 1B illustrates one embodiment for the microprocessor 120 of FIG. 1A and also includes the memory 107. In the representation of FIG. 1B, the microprocessor 120 includes control logic 125, a processing section 140, an input interface 121, and an output interface 123. The dashed lines represent control signals exchanged between the control logic 125 and the other elements of the microprocessor 120 and the memory 107. The solid lines represent the flow of data and instructions within the microprocessor 120 and between the microprocessor 120 and memory 107.

The processing block 140 includes combinatorial logic 143 that is configured to execute instructions and registers 141 in which the combinatorial logic stores instructions and data while executing these instructions. In the simplified representation of FIG. 1B, specific elements or units, such as an arithmetic and logic unit (ALU), floating point unit, and other specific elements commonly used in executing instructions are not explicitly shown in the combinatorial logic 143 block. The combinatorial logic 143 is connected to the memory 107 to receive and execute instruction and supply back the results. The combinatorial logic 143 is also connected to the input interface 121 to receive input from input devices 101 or other sources and to the output interface 123 to provide output to output devices 103 or other destinations.

Figure 2:
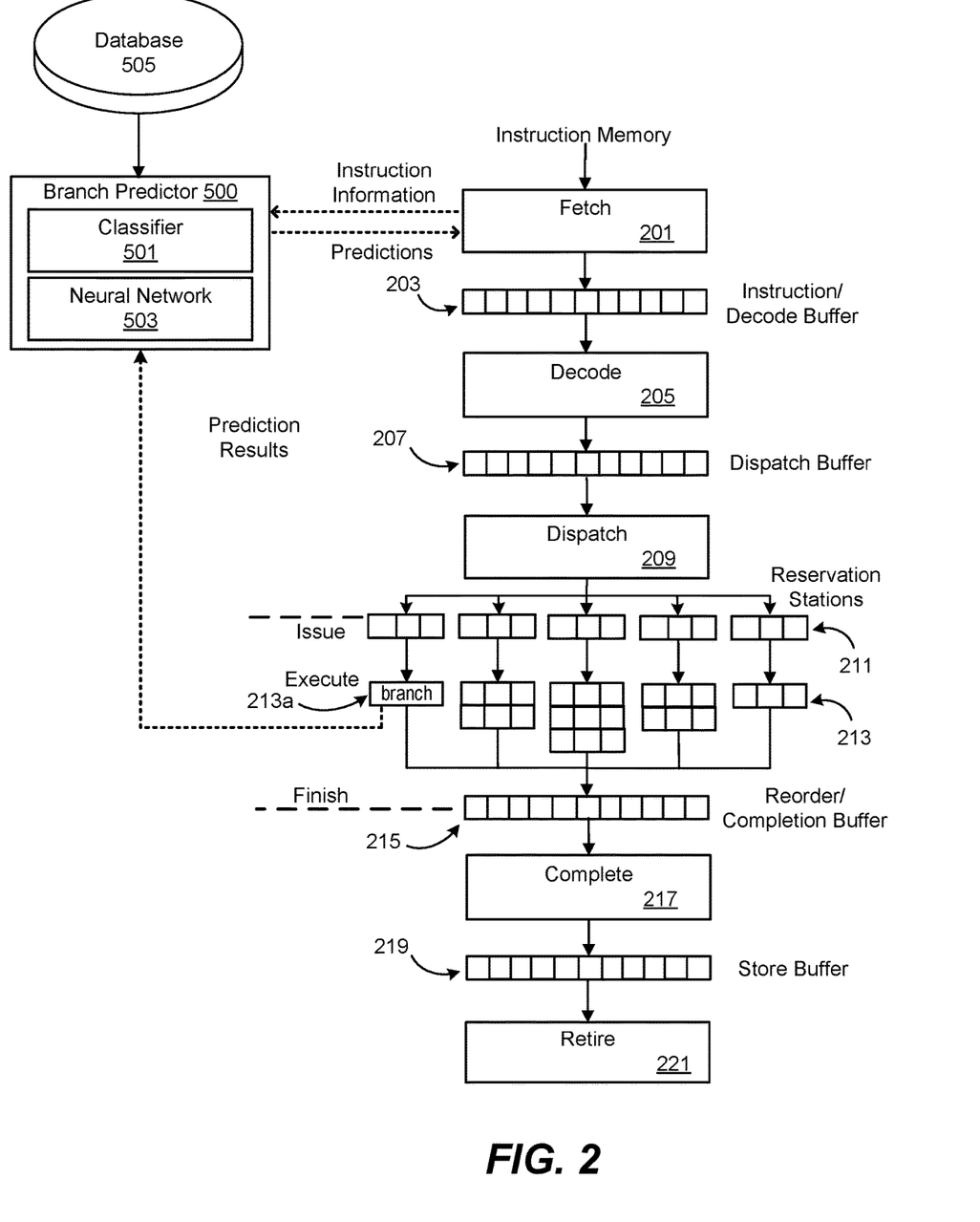
FIG. 2 illustrate the pipelined of a microprocessor like that of FIG. 1B.

FIG. 2 schematically illustrates an embodiment of the pipelined operation of a microprocessor such as can be used in the processing section 140 of microprocessor 120 represented in FIG. 1B. In FIG. 2, the different stages of the pipeline can be executed by the combinatorial logic 143, with the various buffers being part of the registers 141. Depending on the embodiment, the various pipeline stages can be executed though software, hardware elements, firmware, of various combinations of these as further discussed below with respect to FIG. 7. The registers 141, including the various buffers explicitly represented in FIG. 2, are commonly implemented as volatile random access memory (RAM), but some embodiments may also employ some amount of non-volatile memory.

Pipelined microprocessors have a number of variations, where the embodiment of FIG. 2 shows a fairly typical example of a microprocessor integrated circuit in a block representation, but other embodiments can have differing numbers of stages with differing names and functions and can be implemented in hardware, firmware, software and various combinations of these. In FIG. 2, the first stage is a fetch stage 201 that retrieves instructions from the instruction memory and loads them in an instruction/decode buffer 203. The fetched instruction can be stored in the instruction/decode buffer based on the starting and ending addresses of a fetch block and ordered from earliest to latest.

The subsequent stages of the pipeline decode and execute the fetched instructions loaded into the instruction/decode buffer 203, where the embodiment of FIG. 2 illustrates these subsequent stages as a particular set of stages and buffers. Other microprocessor embodiments may have more or fewer stages and may use differing names, but FIG. 2 can be taken as a representative embodiment for purposes of this discussion. In the example of FIG. 2, the various functional stages are represented as blocks and can be implemented through various logic circuitry on the microprocessor's integrated circuit, depending on the embodiment; and buffer sections are represented as the series of smaller squares, where these buffers can be implemented by RAM or other memory and may be distinct or portions of a shared memory, again depending on the embodiment.

The next stage in the pipeline is decode stage 205, which decodes the instructions from the instruction/decode buffer 203 and places them in the dispatch buffer 207 for subsequent execution. Dispatch stage 209 issues the decoded instructions, distributing them to reservation stations 211, after which they are executed as grouped at 213. The results upon finishing execution are then placed in the reorder/completion buffer 215, pass through completion stage 217 and then go to the store buffer 219. Finally, the pipeline ends with the retire stage 221, with any results being written back to memory or provided as output as needed.

The pipeline structure allows for efficient execution of instructions, as while one set of instructions is at one stage, the next set can follow a cycle behind in the preceding stage. However, if an instruction is a branch instruction, once this instruction is to be executed the pipeline can be stalled out until a needed new instruction is fetched and propagates though the pipeline. A branch instruction is a conditional instruction, such as an if-then else or a jump type instruction that is conditional on the value of a register or a flag. For example, FIG. 2 shows a branch instruction at 213a in the far-left slot of the execute stage. A taken branch can only redirect instructions when executed. If this branch requires another instruction to be fetched, this will need to be reported back to the fetch stage 201 so that it can retrieve the needed instruction, which must then propagate through the pipeline. In a modern, deep pipelined microprocessor, this may take 10 or more cycles after being fetched. This results in a large cost in both performance and power, as more than 10 cycles are wasted and, for superscalar microprocessors where multiple pipelines run in parallel, more than 60 instructions in a wrong path being fetched and flushed in a 6-wide superscalar example.

To improve performance of processing speed and efficiency, a microprocessor can use branch prediction, where if an instruction with a branch is fetched, the result of this branch can be predicted, and any needed instructions can then be fetched and speculatively executed. If the prediction is correct, the needed instruction will already be available in the pipeline; while if the prediction is incorrect, the needed instructions will then need to be fetched and the mispredicted instructions flushed. FIG. 2 includes such a branch predictor 500. The branch predictor 500 (which may be hardware, software or firmware) receives information on branching instructions that have been fetched and then makes predictions for instructions to be fetched and speculatively executed. In one embodiment, the information received on branching instructions is stored in database 505, which information may be stored as branch predictor data models. In other embodiments, the branching instructions may be stored on-chip, in local memory of a particular computing device or my any other well know storage means. The branch predictor data models (or "models") may be trained prior to execution of instructions or trained as part of the process during execution of the instructions, as explained below. In one other embodiment, the information may be stored in registers, such as registers 141. The branch predictor 500 can predict the starting and ending addresses of a fetch block, then the fetch stage 201 can use this information to fetch the actual instructions of the fetch block. The correctness of a branch prediction is determined after the branch is executed. In one embodiment, the branch predictor 500 includes a classifier 501 and a neural network 503, explained below.

Consequently, accurate branch prediction is very important for modern high-performance microprocessors in order to reduce the severity of performance penalty, such as latency, caused by branch mispredictions particularly as microarchitectures become more deeply pipelined. Branch predictors based on neural learning or machine learning are the most accurate predictors. These branch predictors, in some embodiments, use neural networks to perform static or dynamic branch prediction. Other forms of neural branch prediction use path-based prediction, which uses neural weights based on the path taken to reach a branch rather than the branch address itself. One explanation of neural path-based prediction may be found in "Fast Path-Based Neural Branch Prediction," Jimenez, D. A., Proceeding of the 36th International Symposium on Microarchitecture (MICRO-36 2003), IEEE 2003.

Figure 3:
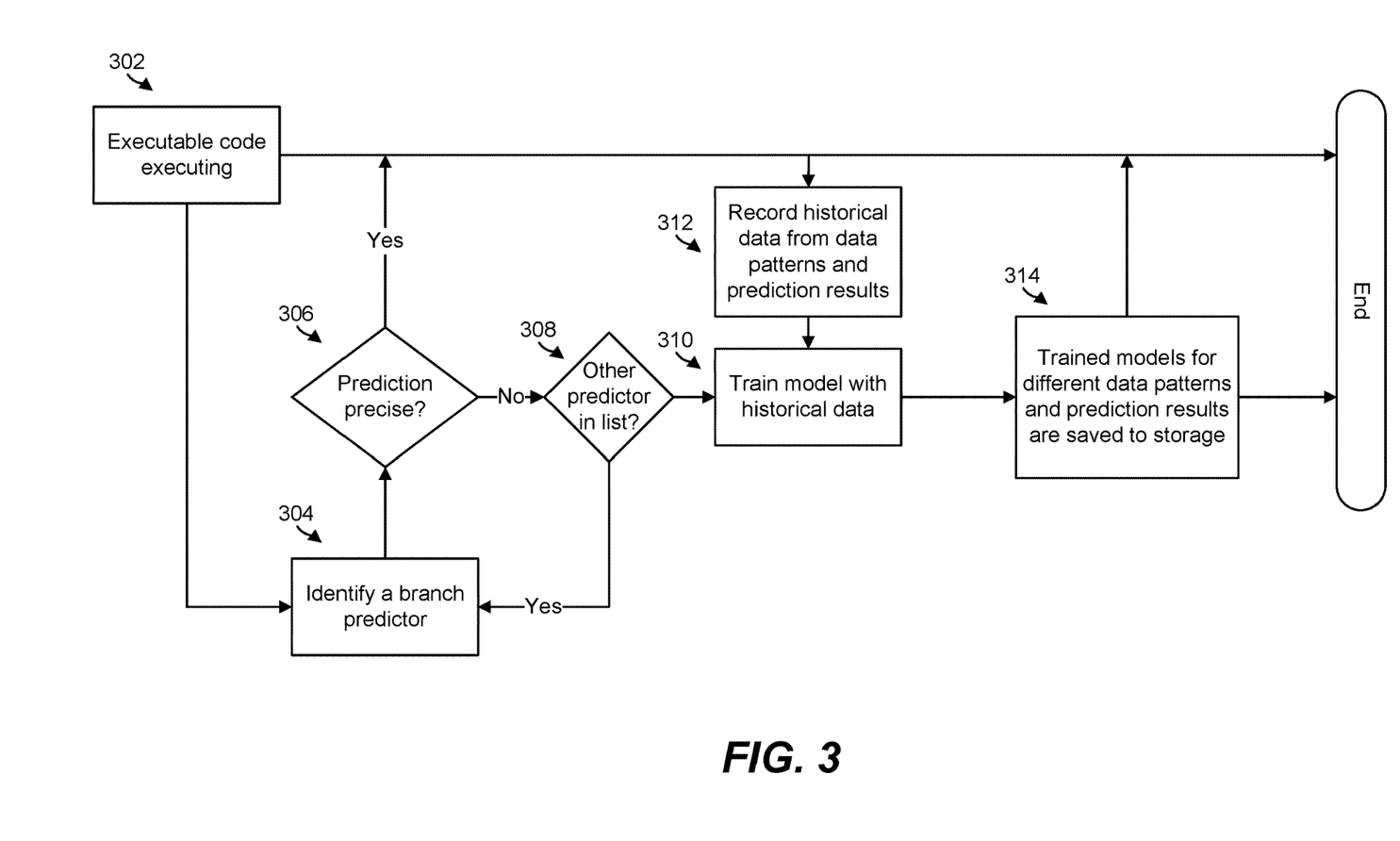
FIG. 3 illustrates a flow diagram for branch prediction in accordance with the present disclosure.

FIG. 3 illustrates a flow diagram for branch prediction in accordance with the present disclosure. In the discussion that follows, a microprocessor performs the procedures. However, it is appreciated that any other functional unit or processing unit may implement the processes described herein, and the disclosure is not limited to implementation by the microprocessor itself.

At step 302, a fetch stage retrieves instructions from the instruction memory. Subsequent stages of the pipeline decode and execute the fetched instructions.

When an instruction is a branch instruction, the microprocessor 120 uses the branch predictor 500 to predict the result of the branch instruction, at step 304. Branch prediction information (also referred to herein as the "branch target predictor" or "inference predictor") for a branch predictor can be stored in a variety of types of data structures within storage circuitry; such as storage circuitry organized as a table, that represent a collection of entries that are accessed using an index value or validation tag. In one embodiment, the branch prediction information is in the form of trained data models that can be stored in a database or external storage. To predict the direction or target address of a branch instruction, the branch predictor 500 first accesses the database 505 to determine whether a pre-trained data model (e.g., from a list of stored pre-trained models) is linked to or matches a currently executing instruction. Within the context of this disclosure, a pre-trained model is a model that has been trained using previously executed instructions.

When a linked or matching pre-trained model is identified by the branch predictor 500, the pre-trained model is used to predict the direction or target address of the branch instruction for the currently executing instruction. The pre-trained model is associated with an inference function that uses input data to calculate which branch (e.g., direction or target address) should be taken. That is, the pre-trained model uses the inference function to generate predictions. A discussion of training and pre-trained models is found below.

At step 306, the branch predictor 500 determines whether the prediction made by the branch predictor 500 is precise. When a pre-trained model is identified that is linked to or matches the currently executing instruction (or program), then the prediction is precise. In this case, the inference function associated with the identified pre-trained model serves the instruction (i.e., the branch instruction is executed). For example, the currently executing instruction may be the same instruction as the previously executed instruction used to train the model, or the currently executing instruction may have the same name as the previously executed instruction. In such a case, the currently executed instruction and pre-trained model are said to be linked or matched.

If the branch predictor 500 fails to identify a pre-trained model that is linked to or matches the currently executing program during step 306 (i.e., the prediction is not precise), then the list of pre-trained models in the database 505 is accessed to identify another pre-trained model for use in predicting the direction or target address of the branch instruction at step 308. For example, a microprocessor may invoke a branch prediction by fetching a pre-trained model which indicates whether a branch will be "taken" or "not taken." If a branch will be taken, the processor may fetch the pre-trained model. If a branch will not be taken, the microprocessor may select another one of the pre-trained models in the list of pre-trained models and repeat the process. Fetching of a pre-trained model from the list of pre-trained models in the database may be a random selection or based on some other methodology.

Invoking a branch prediction may be performed in the pipelined microprocessor architecture described in FIGS. 1A, 1B and 2. As an example, when a branch is encountered, the pipelined microprocessor may use the chosen branch predictor to execute an instruction along the predicted path. The instruction may include a command, query, or the Ike related to a specified operation to be processed or performed by the computing system (e.g., pipelined microprocessor).

In one embodiment, the branch predictor may include a lookup table of $2^{pred-model-p}$ entries, where each entry is indexed by a corresponding "model selection" state. For example, and similar to a 2-bit predictor, the model selection state may be represented as 2-bit counter that provides a predicted branch direction. There are four values of the 2-bit state variable—predict (select) a first model ("00"), predict (select) a second model ("01"), predict (select) and third model ("11") and predict (select) a fourth model ("10"). The prediction model selection state must fail twice for the predicted value to change. In one embodiment, the lookup table entries are initialized to "01" when a synchronization packet is sent. In another embodiment, other predictors, such as the gShare predictor, may be considered as an individual model.

Once the microprocessor has exhausted searching all of the pre-trained models in the database 505 (i.e., none of the pre-trained models result in a precise prediction and no more pre-trained models remain in the list), a new model may be trained for the currently executed instruction at step 310 using, for example, recorded historical data. For example, as executable instructions are running, conventional branch prediction methods may be used to predict the direction or target address of a branch instruction. The conventional branch prediction methods may be both static and dynamic schemes. Examples include, but are not limited to, two-bit counters, bimodal branch prediction, correlated branch prediction, local branch prediction, global branch prediction, global selection branch prediction, global sharing prediction, selective branch predictors, neural branch prediction, etc.

The recorded historical data may be based on data patterns and prediction results collected at step 312, and measured against actual branches taken. For example, branch predictors 500 accumulate data patterns for different branch instruction executions and make their predictions based on the data patterns. These patterns and predictions together form the historical data. The prediction accuracy of a dynamic branch predictor may be a function of the amount of historical data it is capable of accumulating. The branch predictor 500 makes predictions based on a history of characteristics of instructions executed by the microprocessor 120, which predictions are referred to as dynamic predictions. The branch predictor 500 accumulates the historical data as the microprocessor 120 executes instructions. The historical data may include, but is not limited to, an outcome of whether a branch instruction instructed the microprocessor to branch; a target address of a taken branch instruction; addresses of data that was loaded or stored by instructions of the stream; information related to store instructions that specify cacheable memory locations, such as the address of the store instruction, identifiers of the sources used to calculate the store address, a reorder buffer index of an instruction upon which the store data depends, the address and reorder buffer index of a load instruction that previously collided with the store instruction, a reorder buffer index delta between colliding load and store instructions, an indicator of the number of times a colliding load instruction was replayed.

The branch predictor 500 may also make predictions not based on the historical data, which predictions are referred to as static predictions. More specifically, the branch prediction 500 accumulates historical data of the instruction address, direction (taken or not taken), and target address of branch instructions executed by the microprocessor 120 to enable the branch prediction unit 500 to dynamically predict the direction and/or target address of subsequent execution instances of the branch instructions.

In one embodiment, the branch predictor 500 accumulates the historical data by accesses to cacheable memory regions by the instructions in order to detect memory access patterns that it uses to predict which data from the cacheable memory regions will be accessed by the program in the future in order to prefetch the predicted data from system memory into a cache memory of the microprocessor 120 before the program requests the data in order to reduce the memory access time. It is appreciated that any well-known dynamic branch prediction techniques may be used. The collected and recorded historical data may then be used to train the models.

Each time a new model is generated, it may be stored in the database 505 for later retrieval, at step 314. A further explanation of training data models is found below with reference to the disclosed embodiments.

Figure 4A:
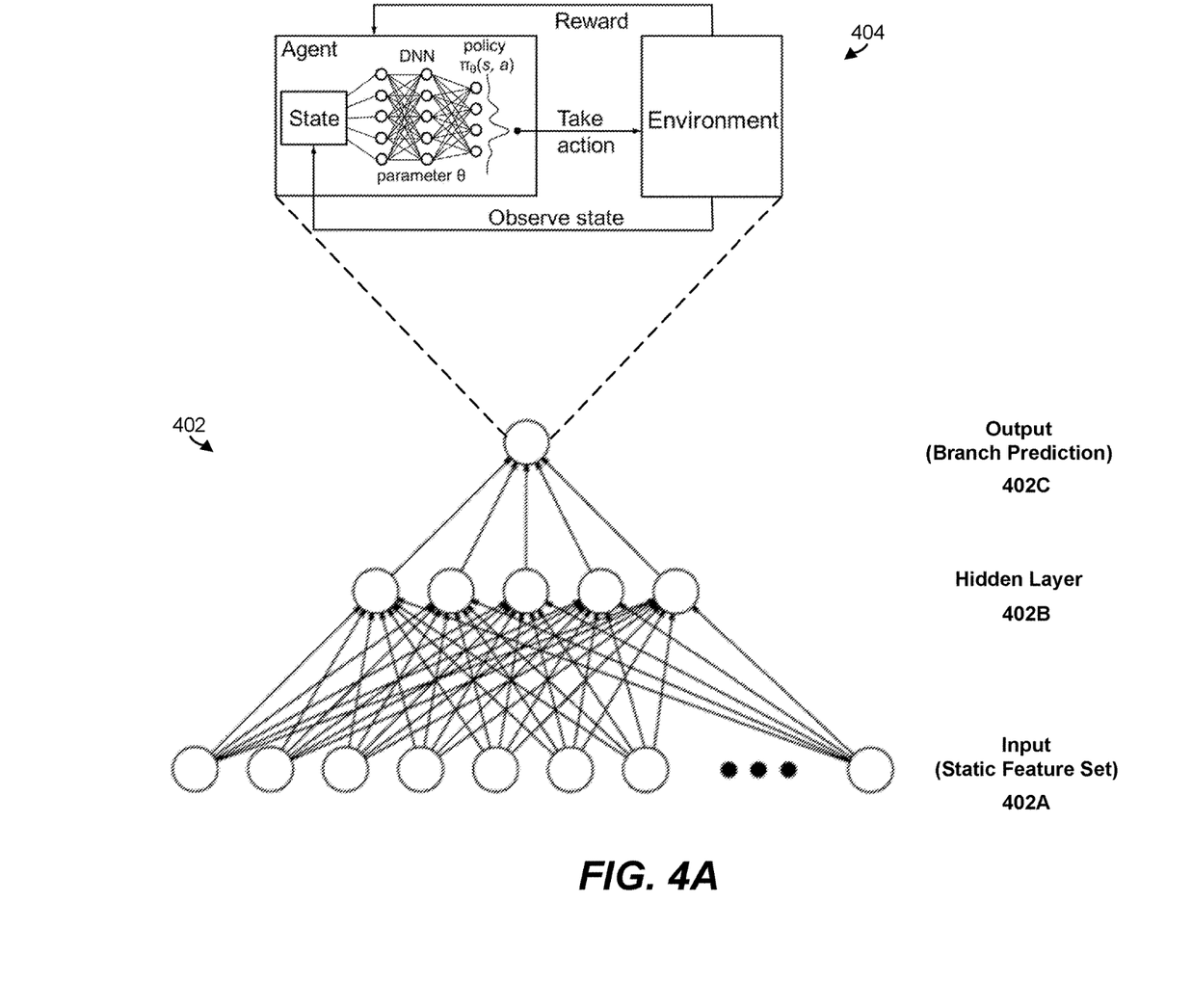
FIGS. 4A-4C illustrate an example of training models as branch predictors in accordance with embodiments of the disclosure.
Figure 4B:
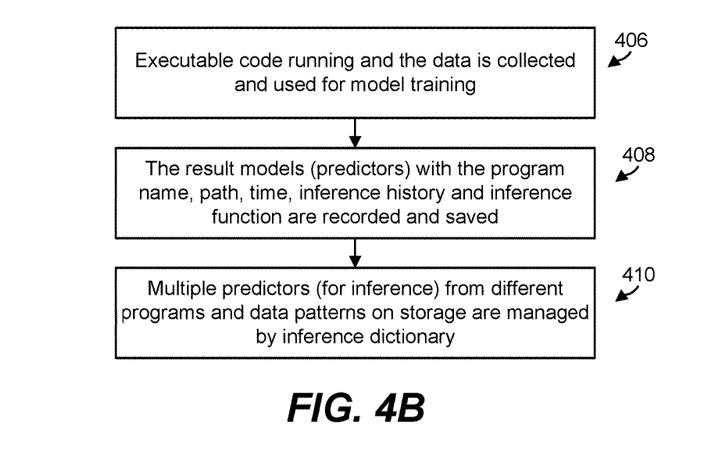
Figure 4C:
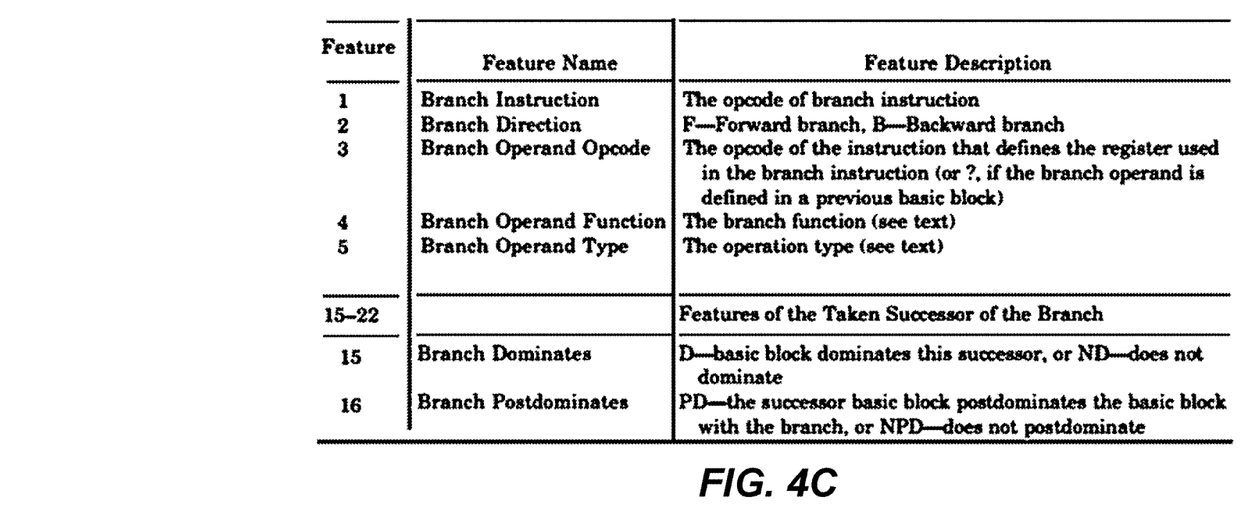

FIGS. 4A-4C illustrate an example of training models as branch predictors in accordance with embodiments of the disclosure. Training models using machine learning increases the accuracy of the branch predictors such that the performance benefits of speculation are also increased. In machine learning, neural networks learn to compute a function using example inputs and outputs. The term "neural network," as used herein refers to a computer-implemented model designed to simulate the behavior of biological neural networks, e.g., for pattern recognition. In some embodiments, the neural network may be implemented as computer readable program instructions, e.g., as program code and data organized as a functional data structure, stored in a computer readable storage medium or hardware component or some combination thereof. Examples of a neural network include, but are not limited to, Convolutional Neural Networks (CNNs) and Deep Neural Networks (DNNs).

In general, branch predictors work by performing pattern recognition on branch history data (historical data), and conditioning the probability that a branch is taken on the observed program state. Embodiments of such a branch predictor may include both learning to train a data model for runtime statistics, and making inferences to generate new predictions from that model. A successful branch predictor may balance the accuracy of both functions against the data, storage, and computation constraints of operating at the front end of a pipeline.

In one embodiment, a multilayer CNN may implement pattern matching on the historical data. CNNs apply a small set of learned filters in many positions (i.e., convolutionally) to detect key patterns that are subject to distortion like positional shifts. Thus, the branch predictor 500 as a CNN is particularly useful in cases where branches depend on program structures, such as when a branch is preceded by a loop whose iteration count changes throughout execution, causing predictive patterns to shift position. The branch predictor uses a multilayer CNN that is optimized to make on-chip inference feasible without requiring heavy front-end computations at prediction time. Specifically, convolutional filter responses may be pre-computed and stored in a database to reduce later on-chip computation. In one embodiment, the pre-computed response may be trained offline. In other embodiments, the pre-computed responses may be trained during execution of currently running instructions (or programs) such that models may be trained on the fly.

With reference to FIG. 4A, the branch predictor 500 may identify branch instructions in a given application program using a sample trace of that program. In order to follow the program flow, the trace includes whether a branch was taken or not. One type of trace is a processor branch trace, which works by tracking execution from a known start address and sending messages about the address deltas taken by the program. Deltas are typically introduced by jump, call, return and branch type instructions. One type of process trace is a RISC-V process trace. In a RISC-V process trace, instructions are executed unconditionally or at least their execution can be determined based on the program binary. Direct branches are the only type of branch that is supported in RISC-V. A detailed discussion of RISC-V may be found, for example, in "RISC-V Processor Trace," version 1.-, by Panesar et al., UltraSoC Technologies Ltd., Mar. 20, 2020.

In general, and as shown in the flow diagram of FIG. 4B, executable code runs and data is collected and used for model training at step 406. The results of the models (i.e., branch predictors) are output and include, for example, the program name, path, time, inference history and inference function (shown in branch format 511) at step 408. The branch predictors (for inference) are then stored for future use. Different branch predictors may be formed as different programs are executed at step 410, That is, different branch predictors correspond to different programs. Collectively, the data models saved in storage may also be referred to as an inference dictionary, as each data model includes an inference function specific to the program that was executed and corresponds to the branch predictor.

More specifically, during operation, the neural network 402 receives an input 402A and transforms it through a series of hidden layers 402B. In one embodiment, the input is a feature set (a feature list of the branches), such as the features listed in the Table of FIG. 4C. For example, feature 1 is a branch instruction, which represents the opcode of the branch instruction, feature 2 is a branch direction, which determines whether a branch is a forward branch or a backward branch, etc. Each hidden layer 402B includes a set of neurons (processing nodes) that have learnable weights and user defined parameters. The last layer is called the "output layer" (or output) 402C which in this case outputs a branch predictor for use in branch prediction. The neural network 402 may be used to extract "features" (e.g., patterns in the branch history that have predictive information about the outcome of the current branch) from complex input data (such as the features) and assign learned weights to those features.

The learned weights may be values representing how likely the outcome of a given branch is a feature, where a feature is a pattern in the incoming data that contains information highly correlated to the outcome of another branch. Once a set of input data (e.g., branch history data) for the neural network 402 is developed, the neural network 402 can be trained (using any number of different learning algorithms) to create a network of associations between features of the input data and outcomes of the branches. For example, the neural network 402 can be organized in a number of layers, where the output of one layer can be fed as input to the next layer. During the training process, the neural network 402 may determine a set of weights for the identified features that provides the neural network 402 with a desired input-output relationship of the layers.

Once the branch history data is input into the neural network 402, the learned weights from the neural network 402 are used to identify the correlated branches (features) from the branch history. These correlated branches may be the most heavily weighted branches as determined by the neural network 402. As a result of the identification, the uncorrelated branches are pruned out or otherwise removed from processing by the branch predictor 500. These features (e.g., correlated branches) are used to build a feature vector that is a vector of a certain length matching the number of features selected from the branch history. Each element of the vector may identify a location of one of the features in the branch history, although other embodiments may also be implemented.

The branch predictor 500 uses the feature vector to build a classification data model, such as a decision tree, to predict current branch outcomes. For example, the classification data model is used to predict the outcome of the correlated branches without interference from the uncorrelated branches. The feature vector comprises a plurality of data fields where each data field identifies an occurrence of a corresponding feature of the correlated branches in the branch history. Each data field of the feature vector may, for example, reference a location of the occurrence of the corresponding feature in the branch history, identify a number of times the occurrence of the corresponding feature is in the branch history, identify whether the corresponding feature is in or absent from the branch history as well as other types of data fields may be used to build vector. Using the feature vector, a data model (i.e., branch predictor) is produced to determine a predicted outcome associated with the correlated branches at output 402C.

In one embodiment, the data model may be produced using an algorithm (or AI agent), such as a Deep Q-Network (DQN) algorithm, through deep reinforcement learning, such as depicted in the example deep reinforcement learning diagram 404. In Deep Reinforcement Learning an agent is represented by a neural network. The neural network interacts directly with the environment to observe the current state of the environment and to decide which action to take (e.g. move left, right etc.) on basis of the current state and the past experiences. Based on the taken action the AI Agent receives a reward. The amount of the reward determines the quality of the taken action with regards to solving the given problem (e.g. learning how to predict which branch to take). The objective of an agent is to learn taking actions in any given circumstances that maximize the accumulated reward over time. Details of deep reinforcement learning are not discussed herein, but are well-known in the art.

Figure 5:
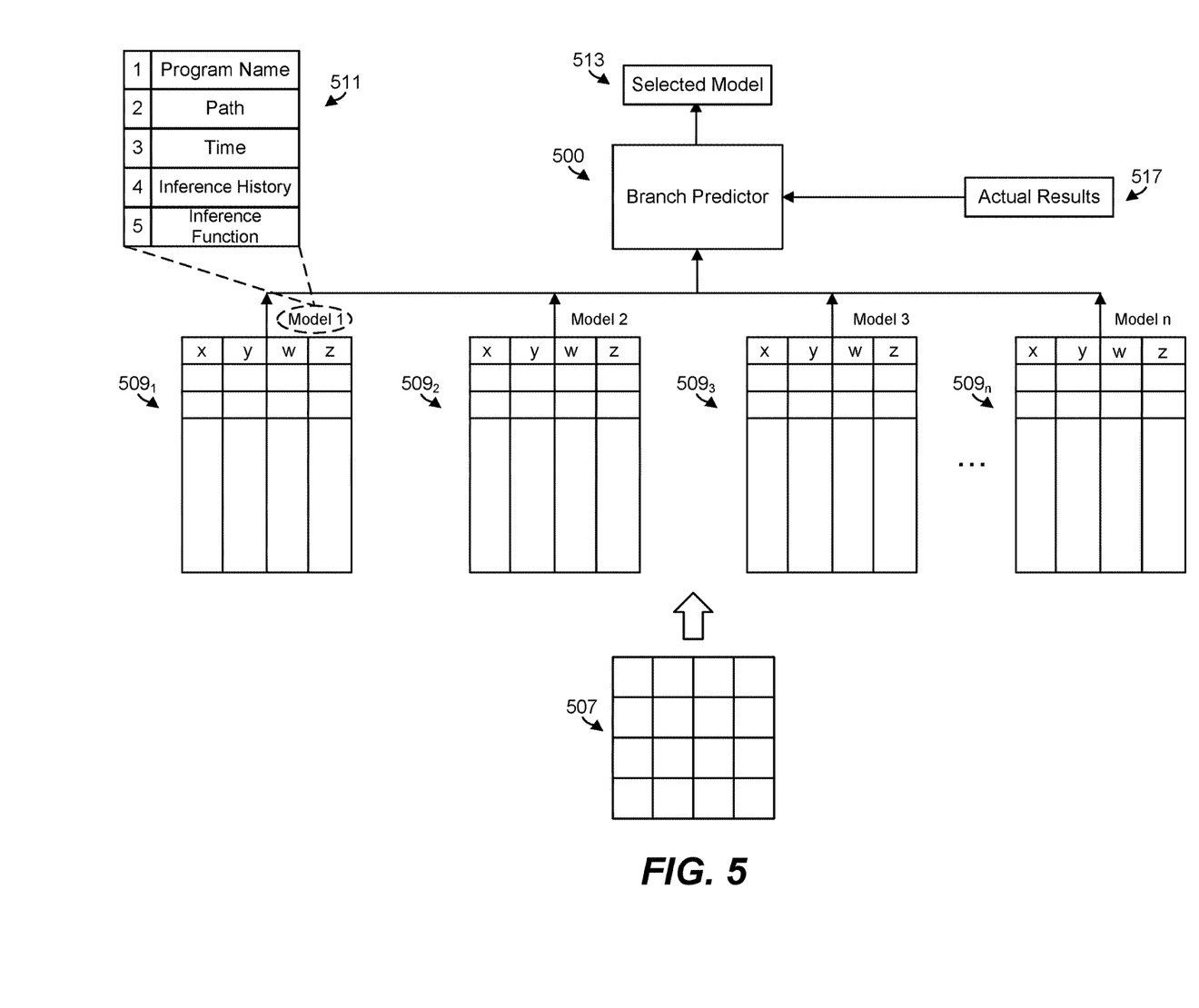
FIG. 5 illustrates an example of inputting data into a branch predictor for selection of trained models, similar to FIG. 4A.

FIG. 5 illustrates an example of inputting data into a branch predictor for selection of trained models, similar to FIG. 4A. Block 507 represents data, such a branch prediction features, being input into a neural network (not shown) for training one or more models $509_1$ to $509_n$. Each of the trained models $509_1$ to $509_n$ are stored in the database 505. In one embodiment, each of the trained models $509_1$ to $509_n$ are saved in a format 511 that includes a program name, a path of the program, a time of the program (i.e., execution time), an inference history and an inference function. When a program is executed, the branch predictor 500 selects one of the data models $509_1$ to $509_n$, as discussed above. If the actual results 517 match the selected model 513, the branch is taken. For example, data model $509_1$ includes historical data x, y, w, z. If the input data program has a same name as the first data model $509_1$, then the first model $509_1$ is selected. Otherwise, each of the data models $509_1$ to $509_n$ will be selected (e.g., randomly) to determine which should be selected based on the historical data x, y, w, z.

Figure 6:
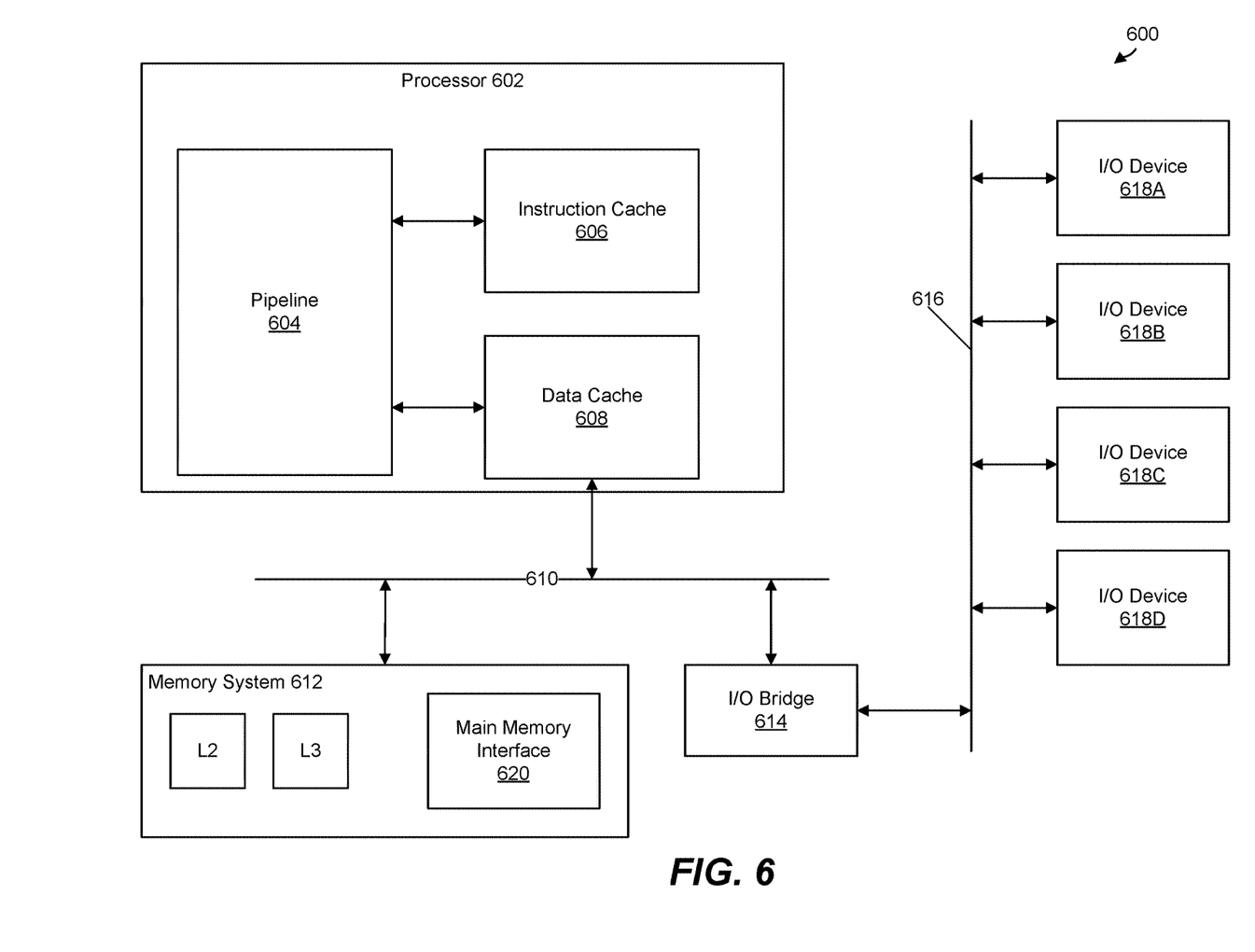
FIG. 6 shows an example of a computing system in which the microprocessor architecture disclosed herein may be implemented.

FIG. 6 shows an example of a computing system in which the microprocessor architecture disclosed herein may be implemented. The computing system 600 includes at least one processor 602, which could be a single central processing unit (CPU) or an arrangement of multiple processor cores of a multi-core architecture. In the depicted example, the processor 602 includes a pipeline 604, an instruction cache 606, and a data cache 608 (and other circuitry, not shown). The processor 602 is connected to a processor bus 610, which enables communication with an external memory system 612 and an input/output (I/O) bridge 614. The I/O bridge 614 enables communication over an I/O bus 616, with various different I/O devices 618A-618D (e.g., disk controller, network interface, display adapter, and/or user input devices such as a keyboard or mouse).

The external memory system 612 is part of a hierarchical memory system that includes multi-level caches, including the first level (L1) instruction cache 606 and data cache 608, and any number of higher level (L2, L3, . . . ) caches within the external memory system 612. Other circuitry (not shown) in the processor 602 supporting the caches 606 and 608 includes a translation lookaside buffer (TLB), various other circuitry for handling a miss in the TLB or the caches 606 and 608. For example, the TLB is used to translate an address of an instruction being fetched or data being referenced from a virtual address to a physical address, and to determine whether a copy of that address is in the instruction cache 606 or data cache 608, respectively. If so, that instruction or data can be obtained from the L1 cache. If not, that miss is handled by miss circuitry so that it may be executed from the external memory system 612. It is appreciated that the division between which level caches are within the processor 102 and which are in the external memory system 612 can differ in various examples. For example, an L1 cache and an L2 cache may both be internal and an L3 (and higher) cache could be external. The external memory system 612 also includes a main memory interface 620, which is connected to any number of memory modules (not shown) serving as main memory (e.g., Dynamic Random Access Memory modules).

Figure 7:
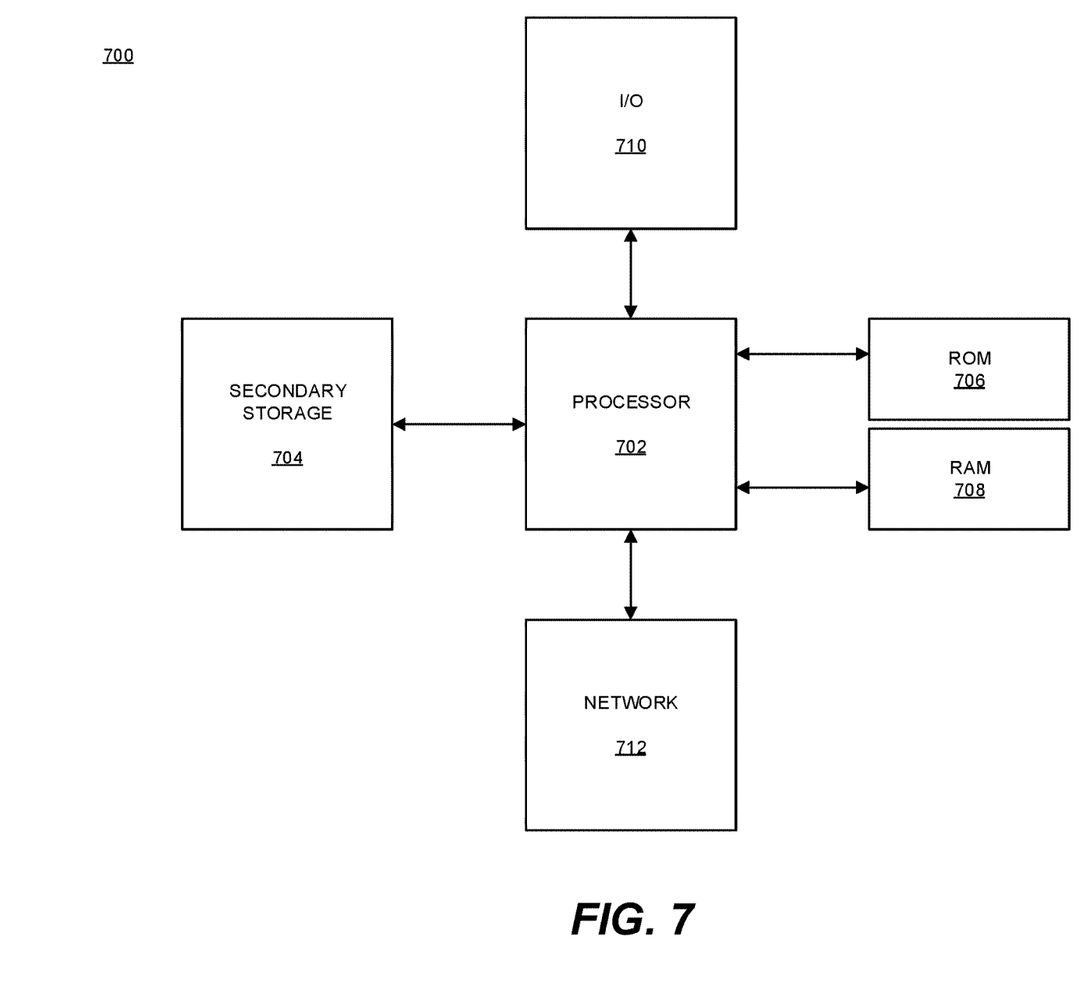
FIG. 7 illustrates a schematic diagram of a general-purpose network component or computer system.

FIG. 7 illustrates a schematic diagram of a general-purpose network component or computer system. The general-purpose network component or computer system 700 includes a processor 702 (which may be referred to as a central processor unit or CPU) that is in communication with memory devices including secondary storage 704, and memory, such as ROM 706 and RAM 708, input/output (I/O) devices 710, and a network 712, such as the Internet or any other well-known type of network, that may include network connectively devices, such as a network interface. Although illustrated as a single processor, the processor 702 is not so limited and may comprise multiple processors. The processor 702 may be implemented as one or more CPU chips, cores (e.g., a multi-core processor), FPGAs, ASICs, and/or DSPs, and/or may be part of one or more ASICs. The processor 702 may be configured to implement any of the schemes described herein. The processor 702 may be implemented using hardware, software, or both.

The secondary storage 704 is typically comprised of one or more disk drives or tape drives and is used for non-volatile storage of data and as an over-flow data storage device if the RAM 708 is not large enough to hold all working data. The secondary storage 704 may be used to store programs that are loaded into the RAM 708 when such programs are selected for execution. The ROM 706 is used to store instructions and perhaps data that are read during program execution. The ROM 706 is a non-volatile memory device that typically has a small memory capacity relative to the larger memory capacity of the secondary storage 704. The RAM 708 is used to store volatile data and perhaps to store instructions. Access to both the ROM 706 and the RAM 708 is typically faster than to the secondary storage 1404. At least one of the secondary storage 704 or RAM 708 may be configured to store routing tables, forwarding tables, or other tables or information disclosed herein.

It is understood that by programming and/or loading executable instructions onto the node 700, at least one of the processor 720 or the memory 722 are changed, transforming the node 700 in part into a particular machine or apparatus, e.g., a router, having the novel functionality taught by the present disclosure. Similarly, it is understood that by programming and/or loading executable instructions onto the node 1300, at least one of the processor 702, the ROM 1406, and the RAM 708 are changed, transforming the node 700 in part into a particular machine or apparatus, e.g., a router, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The technology described herein can be implemented using hardware, firmware, software, or a combination of these. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. For example, some of the elements used to execute the instructions issued in FIG. 2 can use specific hardware elements. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A microprocessor for branch predictor selection, comprising:
    a fetch stage configured to retrieve branch instructions from a memory;
    a buffer configured to store the branch instructions retrieved by the fetch stage;
    one or more pipelined stages configured to execute the branch instructions stored in the buffer; and
    a branch predictor, communicatively coupled to the buffer and the one or more pipelined stages, configured to:
        select a branch target predictor from a set of branch target predictors, wherein each of the branch target predictors comprises a trained neural network model associated with a previously executed branch instruction, and
        identify a target branch path for one or more of the branch instructions when executed by the one or more pipelined stages, the identification of the target branch path being based on the selected branch target predictor;
        compare the selected branch target predictor to one or more branch instructions currently being executed to determine whether the selected branch target predictor is precise and thus matches the one or more branch instructions currently being executed;
        select a new branch target predictor from the set of branch target predictors when the selected branch target predictor does not match the one or more branch instructions currently being executed and iteratively repeat selecting the new branch target predictor in the set of branch target predictors until the selected new branch target predictor matches the one or more branch instructions currently being executed or no branch target predictor in the set of branch target predictors matches the one or more branch instructions currently being executed;

train a new model with historical data when none of the set of branch target predictors in the set of branch target predictors matches the one or more branch instructions currently being executed, wherein the historical data is based on collected data patterns and prediction results corresponding to the branch instructions when executed; and store the new model as one of the branch target predictors in the set of branch target predictors.

2. The microprocessor of claim 1, wherein the selected branch target predictor is further configured to:

invoke an inference function in the selected branch target predictor when the selected branch target predictor matches the one or more branch instructions when executed, the inference function identifying the target branch path for the one or more branch instructions currently being executed.

3. The microprocessor of claim 1, wherein the trained model corresponding to the selected branch target predictor is updated based on a comparison between the selected branch target predictor and a result of an actual branch instruction.

4. The microprocessor of claim 1, wherein the set of branch target predictors is stored in a storage accessible to the one or more pipelined stages.

5. The microprocessor of claim 4, wherein each of the set of branch target predictors stored in the storage includes historical data and an associated inference function corresponding to branch instructions previously executed by the one or more pipelined stages.

6. The microprocessor of claim 5, wherein each of the branch target predictors includes a historical data pattern of the branch instructions previously executed by the microprocessor and make predictions related to subsequent branch instructions based on the historical data pattern associated with the selected branch target predictor while the microprocessor is executing the subsequent branch instructions.

7. The microprocessor of claim 6, further comprising one or more registers to store the historical data pattern for at least one or more executed branch instructions, in which the historical data pattern for a branch represented by a particular branch instruction comprises data patterns and prediction results from a previously executed branch instruction.

8. The microprocessor of claim 1, wherein the selected branch target predictor comprises a co-processor or field-programmable gate array.

9. A computer-implemented method for branch predictor selection, comprising:

fetching, by a fetch stage, one or more branch instructions from a memory;

storing the one or more branch instructions retrieved by the fetch stage in a buffer;

executing the one or more branch instructions stored in the buffer by one or more pipelined stages;

selecting, by a branch predictor, a branch target predictor from a set of branch target predictors, wherein each of the branch target predictors comprises a trained neural network model associated with a previously executed branch instruction;

comparing the selected branch target predictor to one or more branch instructions currently being executed to determine whether the selected branch target predictor is precise and thus matches the one or more branch instructions currently being executed;

selecting a new branch target predictor from the set of branch target predictors when the selected branch target predictor does not match the one or more branch instructions currently being executed and iteratively repeating selecting the new branch target predictor in the set of branch target predictors until the selected new branch target predictor matches the one or more branch instructions currently being executed or no branch target predictor in the set of branch target predictors matches the one or more branch instructions currently being executed;

training a new model with historical data when none of the set of branch target predictors in the set of branch target predictors have been selected, wherein the historical data is based on collected data patterns and prediction results corresponding to the branch instructions when executed; and storing the new model as one of the branch target predictors in the set of branch target predictors; and identifying, by the branch predictor, a target branch path for one or more of the one or more branch instructions currently being executed based on the selected branch target predictor.

10. The computer-implemented method of claim 9, further comprising:

invoking an inference function in the selected branch target predictor, by the branch predictor, when the branch target predictor matches the one or more branch instructions currently being executed, the inference function identifying the target branch path for the branch instruction currently being executed.

11. The computer-implemented method of claim 9, wherein the trained model corresponding to the selected branch target predictor is updated based on a comparison between the branch target predictor and a result of an actual branch instruction.

12. The computer-implemented method of claim 9, wherein the set of branch target predictors is stored in a storage accessible to the one or more pipelined stages.

13. The computer-implemented method of claim 12, wherein each of the set of branch target predictors stored in the storage includes historical data and an associated inference function corresponding to branch instructions previously executed by the one or more pipelined stages.

14. The computer-implemented method of claim 13, wherein each of the branch target predictors includes a historical data pattern of the branch instructions previously executed and make predictions related to subsequent branch instructions based on the historical data pattern associated with the selected branch target predictor while a microprocessor is executing the subsequent branch instructions.

15. The computer-implemented method of claim 14, further comprising storing, in one or more registers, the historical data pattern for at least one or more executed branch instructions, in which the historical data pattern for a branch represented by a particular branch instruction comprises data patterns and prediction results from a previously executed branch instruction.

16. The computer-implemented method of claim 9, wherein the branch predictor comprises a co-processor or field-programmable gate array.

* * * * *